United States Patent [19]

Andreasson

[11] 3,785,395
[45] Jan. 15, 1974

[54] AIR VALVES

[76] Inventor: Bror Elis Andreasson, Bangatan 21, Vanersborg, Sweden

[22] Filed: Dec. 14, 1972

[21] Appl. No.: 315,227

[30] Foreign Application Priority Data

| Jan. 19, 1972 | Sweden | 566/72 |
| Nov. 8, 1972 | Sweden | 14446/72 |
| Nov. 8, 1972 | Sweden | 14442/72 |
| Nov. 8, 1972 | Sweden | 14444/72 |

[52] U.S. Cl. ............................. 137/223, 5/348 R
[51] Int. Cl. ........................................ F16k 15/20
[58] Field of Search ................... 137/223, 234.5; 5/348 R; 9/11, 13; 206/DIG. 30

[56] References Cited
UNITED STATES PATENTS

| 3,260,276 | 7/1966 | Stasiunas | 137/234.5 |
| 2,949,927 | 8/1960 | Mackal | 137/223 |
| 2,701,579 | 2/1955 | Hasselquist | 137/223 |

Primary Examiner—Harold W. Weakley
Attorney—Robert E. Burns et al.

[57] ABSTRACT

In air valves for use in connection with large inflatable objects and of the kind comprising a valve housing having air through-flow openings at its inner end and an annular valve seat, a valve disc arranged to be pressed against said seat by the internal pressure in the object and means to releasably retain said valve disc in blocked position. The blocking means are arranged on the valve disc proper and are accessible from the outside and so arranged that no special tools are required to manipulate the valve disc. The blocking means may be formed in various ways, such as in the form of a tongue to be inserted in a recess in the valve housing wall, a fork-shaped projection of the disc engaging underneath a stud formed in the housing wall, a piston having a ball-shaped end and cooperating with spring means to exert a pressing action on the valve disc, recesses formed in the valve having bottom into which recesses projections on the valve disc are urged, possibly while bending the disc against the resiliency of the disc material itself, etc.

24 Claims, 26 Drawing Figures

AIR VALVES

BACKGROUND OF THE INVENTION

The present invention concerns improvements in air valves for use in connection with comparatively large, inflatable articles such as inflatable furniture and boats of rubber or non-rigid plastics, these valves comprising a valve housing having at its inner end apertures formed in the valve housing wall for passage therethough of air, and an annular seat facing said valve housing end, a valve disc being provided in contact with said seat and arranged to be pressed against said seat into sealing abutment therewith by the internal pressure inside the article, in addition to which means are included in said valve arrangement to evacuate the article in order to keep said valve disc at a distance away from its seat.

When evacuating inflatable articles provided with one or several valves of the kind outlined above it has hitherto been necessary to keep the valve disc away from its valve seat during the entire evacuation process either manually, i.e., with the aid of the fingers or by means of a tool of some kind which may be inserted into the valve housing to prevent the disc from being sucked away by the air stream and again take its sealing position as soon as released. To use the fingers is, however, inconvenient and in addition one person has to devote himself to this task unnecessarily during the entire evacuation process. On the other hand, locking the valve disc by means of a tool is more advantageous but tools are easily lost unless fixed adjacent the valve and in the latter case, they often become an incumbrance in handling or use of the inflatable object. If the tool is lost, a critical situation arises, as valves, arranged to be operated by means of tools, may be difficult to operate manually.

SUMMARY OF THE PRESENT INVENTION

The above problems are completely obviated by means of the present invention which for this purpose is characterised in that the valve disc proper is formed with the very means to effect releasable blocking of the disc in an open position at a distance away from the disc valve seat.

By means of an air valve in accordance with the present invention it is possible to evacuate an article quickly without inserting any tools or devices of any kind into the valve housing or without having to keep the disc away by means of the fingers. The valve is very reliable and the manipulations for effecting shifting of the disc very simple.

BRIEF DESCRIPTION OF THE DRAWINGS

The invention will be described more in detail in the following with reference to the accompanying, partly diagrammatical drawings illustrating various embodiments of the invention. In the drawings.

DETAILED DESCRIPTION OF PREFERRED EMBODIMENTS OF THE INVENTION

As illustrated in the drawings, an air valve in accordance with the present invention comprises an essentially cylindrical valve housing 1 having a bottom plate 2 and a valve disc 3. The valve disc 3 is arranged to be urged into sealing abutment against a valve seat 4 by means of the internal pressure inside the inflated article, said valve seat 4 being positioned at the inner end of the valve housing. The valve housing is provided with an annular flange 5 which is intended to be attached, by glueing, welding or otherwise, to the wall 6 of the article to be inflated. The bottom 2 is attached to the valve housing 1 by means of studs 8 provided with ribs 7 and positioned along the periphery of the bottom, said studs being adapted to engage in corresponding apertures 9 formed in lugs 10, positioned at the inner end of the valve housing spaced suitable distances apart. The lugs 10 serve as distance means and the space between the valve seat 4 and the bottom 2 houses the valve disc 3. The latter is provided with a gripping member 12 directed towards the outer mouth 11 of the valve housing and being smooth on one side but provided with knurls 13 on the other to provide an easy and quick identification means of the blocking and opening direction, respectively, for the person operating the valve.

Figure 1:
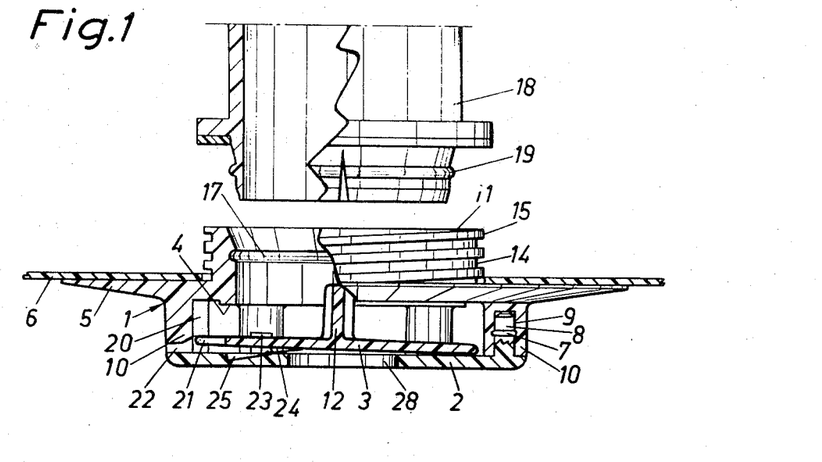
FIG. 1 illustrates in a partly broken longitudinal section a valve arrangement in accordance with the invention and an air supply nozzle, the valve being in an open position.
Figure 2:
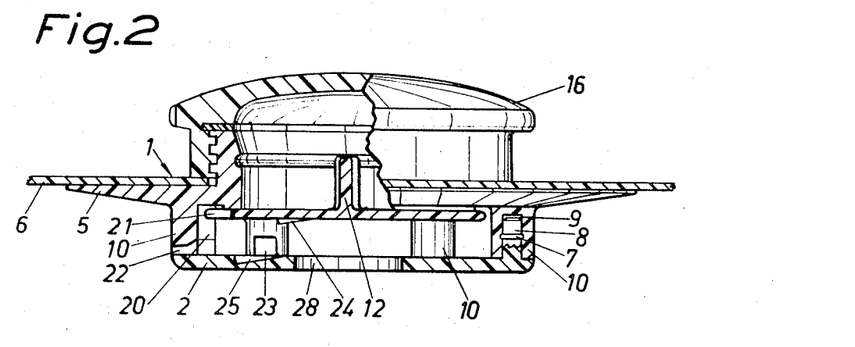
FIG. 2 is a partly broken sectional view through the same valve arrangement as in FIG. 1 but provided with a lid and the valve being in closed position.
Figure 3:
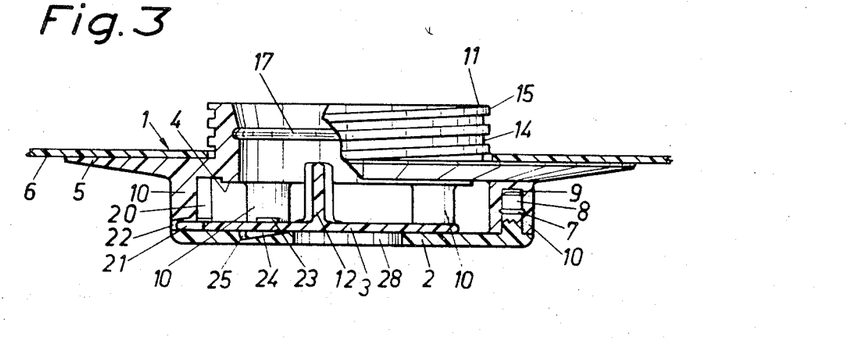
FIG. 3 shows the valve arrangement when the valve disc is in blocked position.
Figure 4:
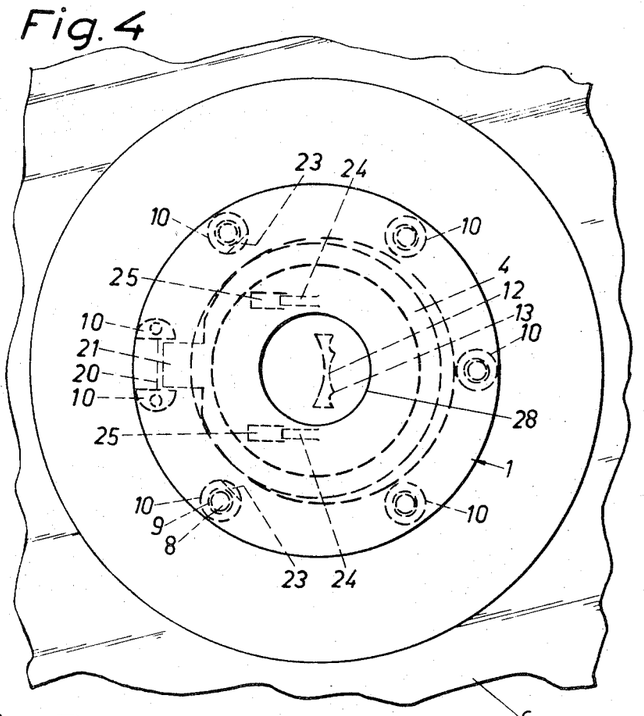
FIG. 4 is a view from beneath of the valve arrangement, the valve disc being in a free position.
Figure 5:
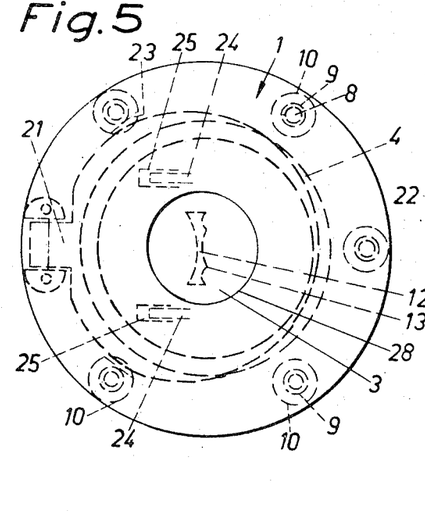
FIG. 5 is a similar view from beneath, illustrating the valve disc in a blocked position.

The outer end 14 of the valve housing 1 is provided at the outer face with threads 15 for a lid 16 (see FIG. 2) to be screwed onto the housing when the valve is not in use. The inner face of the mouth 11 of the valve housing 1 is provided with a peripheral groove 17 in which a peripheral rim 19, provided on the outside face of the air supply nozzle 18, is arranged to be received to seal and removably retain the nozzle during air filling.

Figure 6:
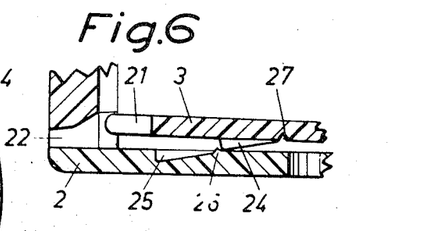
FIG. 6 is a partly broken, detailed view of the valve disc and the bottom of the valve housing together with the disc blocking means.

One of the lugs 10 is wider than the rest and provided with a guide channel 20 extending in the longitudinal direction of the valve housing and arranged to receive therein a tongue 21 extending radially from the periphery of the valve disc 3. The end of the guide channel 20 positioned closest to the bottom 2 is provided with a notch 22 into which the tongue 21 is arranged to be inserted upon displacement of the valve disc laterally into blocked position. At the base of the tongue 21 the valve disc is somewhat curved inwards to allow free passage of the edge portions of the guide channel 20. In order to prevent the valve disc from springing outwards when influenced by the air suction during evacuation of the article, two of the lugs 10, positioned closest to the lug formed with the guide channel 20, are provided with notches 23 adjacent the bottom portion 2 in which notches the neighbouring edge portions of the valve disc 3 will be wedged upon displacement of the disc into blocked position. The notch 22 is formed with one bevelled inner margin to facilitate insertion of the tongue 21 into the notch. The lower face of the valve disc 3, facing the bottom 2, is provided with some bosses 24 serving as guide means and adapted, upon displacement of the valve disc 3 into blocked position, to be received in wells 25 of corresponding shape formed in the bottom portion 2. The wells 25 have sloping bottoms and at their upper edges where the bosses slide down for reception in the wells they are provided with a blocking rim 26 (see FIG. 6) arranged, when the valve disc 3 has reached its blocked position, to snap into a corresponding notch 27 formed in the lower face of said valve disc.

During evacuation and air filling of the article in question air will flow essentially through the spaces between the lugs 10 but it furthers the closing movement of the valve disc if the bottom portion 2 is provided with apertures 28 underneath the disc 3 such that a certain pressure is exerted against said disc from below and presses it against the seat during the first stage.

The valve disc 3 is unable to turn in its space as the tongue 21 never moves out of but along the guide channel 20, and consequently it is always possible, even if the direction is not discernable from the outside, to decide with the aid of the knurls 13 on the one side of the finger gripping member 12 in which direction the valve disc 3 is to be displaced for blocking or release, as the case may be.

The valve housing 1 may be attached to the inflatable article wall by means of an external screw ring which may be provided with a sealing ring. The finger gripping member may be replaced by a cavity, depression or the like. The lugs may have virtually any cross-sectional shape without altering the function.

In accordance with the embodiments illustrated in FIGS. 7–14, the bottom plate 2 is attached to the valve housing main body 29 by riveting extension portions 30 of downwardly directed studs 31 of the main body 29, spaced equidistantly apart along the periphery of the valve housing 1 such that air passage spaces 32 are formed between the main body 29, the bottom plate 2 and the studs 31. One of the studs 31, designated 31', is provided with a shoulder 33 facing the bottom plate 2 and positioned at a distance away therefrom which only slightly exceeds the thickness of the valve disc 3. The latter is imagined made from some comparatively rigid but yet slightly resilient plastics. The tongue 21 of the valve disc 3 is formed like a fork engaging with its two prongs 34 on either side of the stud 31' in such a way that without being turned the valve disc may be displaced in the directions illustrated by the two-way arrow 35 in FIG. 9. Upon displacement to the left in accordance with this figure, the base portion 36 interconnecting the prongs 34 engages underneath the shoulder 33.

However, it is not possible without further to displace the valve disc in a manner permitting said base portion 36 to engage underneath the shoulder 33. This is prevented by the boss 24 positioned on the lower face of the disc as the distance of the boss from the base 36 is such that, as appears from FIG. 7, it is impossible to move the valve disc 3 to the left to permit the boss 24 to slide down into the well 25 in the bottom plate 2 without first forcing the disc against the action of the resiliency of the disc material to bend somewhat in a curve downwards adjacent the tongue 21. This means that the disc will be forced to snap into the blocking position illustrated in FIG. 8 wherein the valve disc is retained upon evacuation of the inflatable article on which the valve is provided without any risk that the valve disc, under the influence of the air stream, will be pressed sealingly against the valve seat 4. Of course, it is not either possible at that instant to displace the disc to the right into release position of the disc without it being necessary to first bend the disc somewhat upwards against the action of the resiliency of the disc material and the bottom plate 2.

Figure 7:
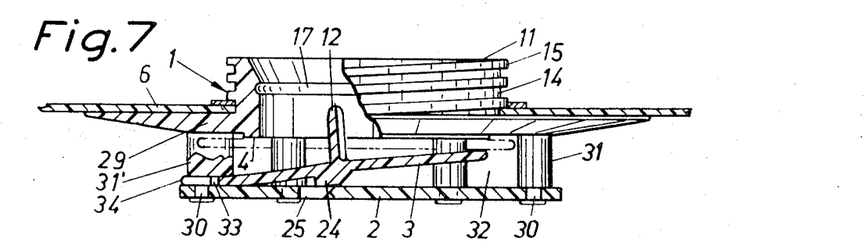
FIG. 7 illustrates in a partly broken longitudinal section a valve arrangement in accordance with a second embodiment of the invention, the valve disc being displaced laterally into blocked position.
Figure 8:
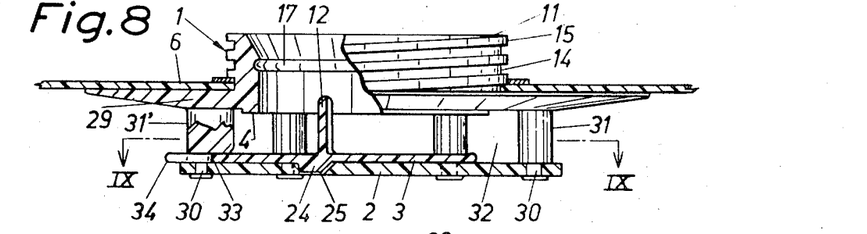
FIG. 8 is a similar sectional view with the valve disc in blocked position.
Figure 9:
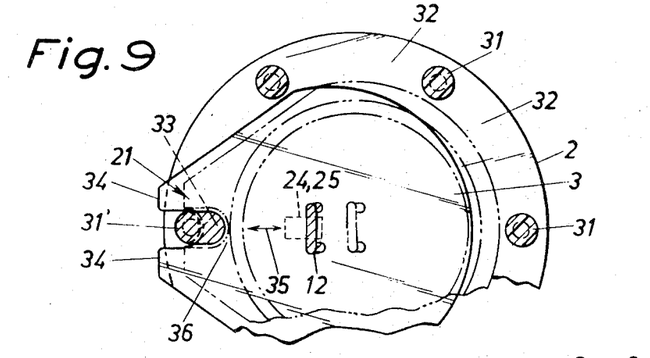
FIG. 9 is a partly broken horizontal section through the valve housing of FIG. 8 along line IX—IX.
Figure 10:
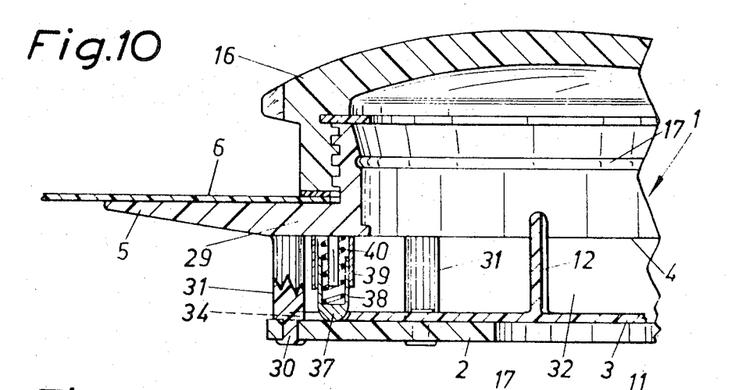
FIG. 10 illustrates on a somewhat larger scale a broken longitudinal section through a valve in accordance with a third embodiment with the valve disc in free position.
Figure 11:
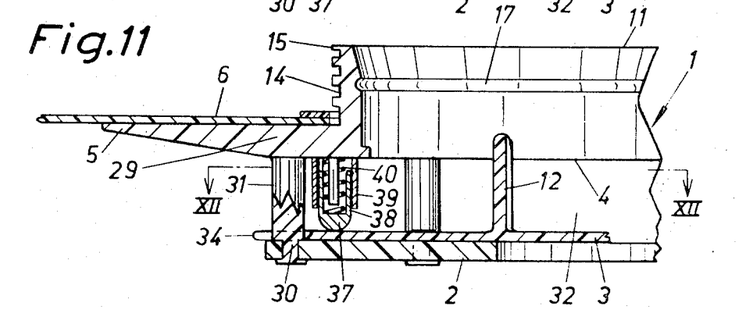
FIG. 11 is a similar section showing the valve disc in blocked position.
Figure 12:
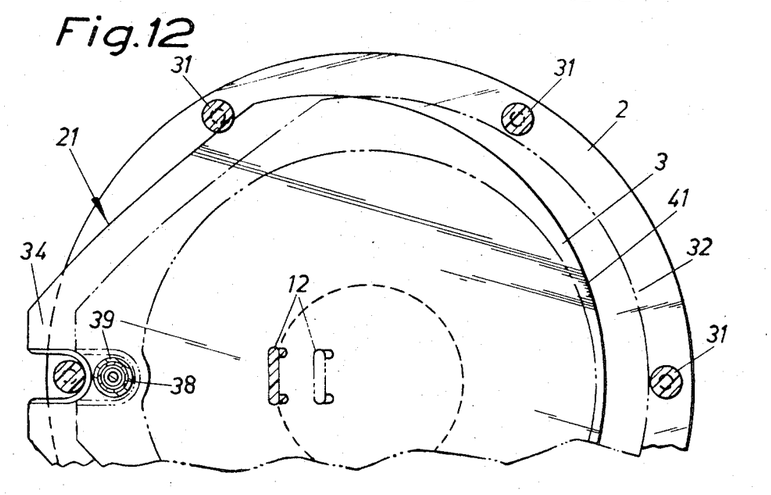
FIG. 12 is a partly broken horizontal sectional view through this valve housing along line XII—XII of FIG. 11.

The shape of the valve disc 3 in accordance with the embodiment of FIGS. 10–12 coincides with that of the embodiment shown in FIGS. 7–9 with the exception that the guide boss 24 has been eliminated. Blocking effect, i.e., the easily releasable maintenance of the valve disc 3 in blocked position (FIG. 11), is instead achieved by means of the ball-shaped or spherical lower end 37 of a piston 38 which is vertically and displaceably guided in a sleeve 39 and by means of a spring 40 is retained in engagement position against the face of the valve disc 3 facing the valve seat 4.

Upon displacement of the valve disc 3 to the left in accordance with FIG. 10 into the blocked position illustrated in FIG. 11 (both positions also illustrated in FIG. 12 with dash-and-dot lines and full lines, respectively), this displacement being performed by the fingers of one hand gripping around the finger gripping memeber 12, the piston 38 is pushed against the action of the spring 40 up onto the valve disc 3. The latter is retained in blocked position by the spring force and thus is prevented from being entrained by the air stream out through the valve seat 4 to closing position. When the article in question is again to be inflated, the valve disc is pushed to the right in accordance with the drawing until the trailing edge 41 of the valve disc abuts against the studs positioned in this location, and now the valve disc may be moved to its sealing position against the seat 4 while guided by these studs and by the sleeve 39 gripped by the fork legs 34.

Figures 13, 14:
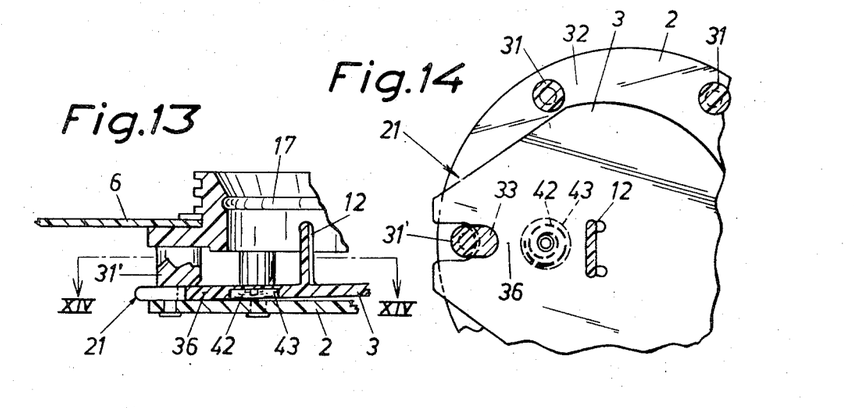
FIG. 13 is a broken longitudinal sectional view through a valve in accordance with a fourth embodiment.
FIG. 14 is a horizontal sectional view through this valve housing along line XIV—XIV of FIG. 13.
Figure 15:
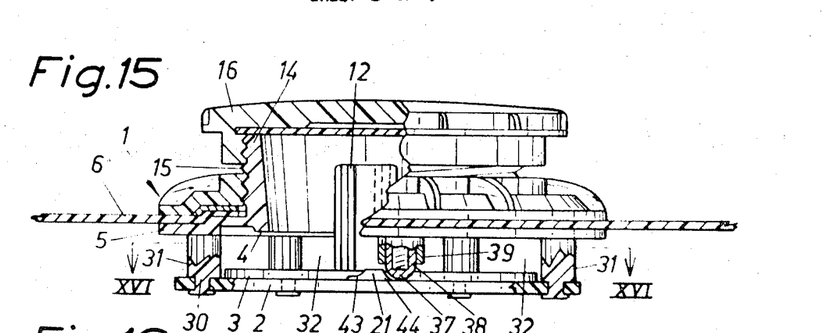
FIG. 15 is a partly broken longitudinal sectional view through a valve arrangement according to a fifth embodiment of the invention with the valve in open position, the valve in accordance with this embodiment being provided with a screw top.

In accordance with the embodiment illustrated in FIGS. 13 and 14, a coil spring 42 provides an upwardly directed clamping action, whereby the valve disc 3 is releasably retained in blocking position when the base portion 36 of the tongue 21 is inserted underneath the shoulder 33. The spring 42 is imagined fixed by rivets to the lower face of the valve disc 3 in such a manner that in its compressed position it is practically completely hidden in a recess 43 in the lower face of the valve disc.

In addition to the embodiments illustrated in FIGS. 7-18, further embodiments are conceivable within the scope of the appended claims. The piston 38 may be slidingly guided around the sleeve 39 instead of, as illustrated in FIGS. 10 and 11, guided inside the sleeve. The coil spring 42 may be replaced by another spring means, such as a metal band spring. It is also possible to manufacture either the valve disc 3 or the bottom plate 2 with strap-shaped, resilient rails, arms or the like formed integral with the valve disc 3 or the bottom plate 2 and causing the above clamping action to retain the valve disc in blocked position.

Also the valve disc 3 in accordance with the embodiments illustrated in FIGS. 15-21 is provided with a gripping member 12 directed towards the outer mouth 14 of the valve housing, said mouth being closable by means of a screw lid 16. In addition, the valve disc 3 is provided with a radially outwardly directed tongue 21 having inclined surfaces 43, 44 extending in either direction downwardly from the tongue central portion.

The valve housing 1 is, as according to the embodiment illustrated in FIGS. 10-12, provided with an open bottom guide sleeve 39 directed downwardly towards the bottom plate 2, a piston 38 being positioned in said sleeve for longitudinal displacement therein and having a spherical ball-shaped lower end 37 which under the action of a spring 40 is pressed downwards into contact with the bottom plate 2. The piston 38 blocks the way for the tongue 21 of the valve disc 3 when the latter is turned in the direction illustrated by arrow 22 in FIG. 16.

Figure 18:
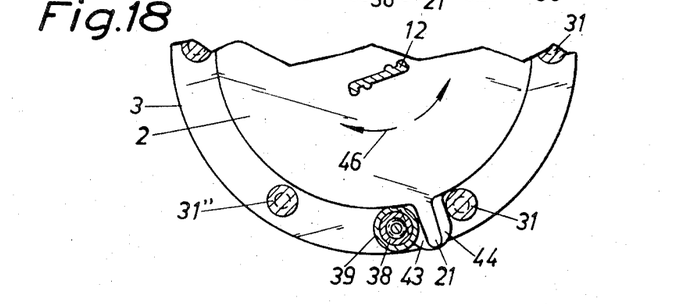
FIG. 18 is a partly broken cross-sectional view through the valve arrangement along line XVIII—XVIII of FIG. 17.

Before the article in question is to be inflated, which happens after removal of the lid 16 and insertion of a nozzle (not illustrated) into the mouth 14, the valve disc 3 is turned in the direction illustrated by arrow 46 in FIG. 18 such that the tongue 21 will be positioned between the sleeve 39 and the stud designated 31" in FIG. 18. The valve disc is then free to move such that, upon completion of the inflation and removal of the nozzle from the mouth 14, the disc may be entrained by the air stream through said mouth through suction and place itself in a sealingly abutting position against the seat 4.

Figure 16:
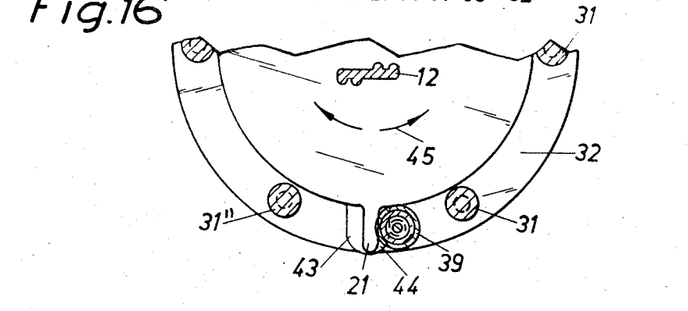
FIG. 16 is a partly broken cross-sectional view through the valve arrangement along line XVI—XVI of FIG. 15.
Figure 17:
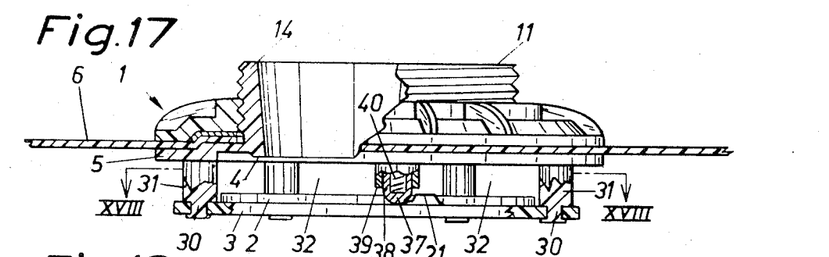
FIG. 17 is a similar longitudinal section as in FIG. 15, illustrating the valve disc in blocked position.

When the inflated article is to be evacuated, the fingers of one hand are used to grip the gripping element 12 to press the valve disc 3 downwards against the bottom plate 2, whereupon the valve disc is turned in the direction of arrow 45 in FIG. 16 such that the tongue 21 slides in underneath the piston end 37 and pushes the piston against the action of spring 40 upwards into the sleeve 39 such that, when the tongue 21 abuts against the stud 31, it will slide down along the inclined surface 43 and thus block the valve disc in the position illustrated in FIG. 18. Owing to the pressure of piston 38 against the upper face of the tongue 21, the valve disc is maintained in abutment position against the bottom plate 2 with sufficient force to prevent the disc from being entrained by the air stream discharged through the mouth 14 and thus place itself against the seat 4 (thus preventing continued evacuation). Upon subsequent pressing of pressurized air into the article, prior to which the valve disc 3 has been turned to its freee position with the tongue 21 adjacent the stud 31" (FIG. 18), the valve disc is in a position flat against the bottom plate and no longer constitutes a hindrance, preventing air from flowing in through the space 32 between the studs, 31, 31". Upon completion of air intake, the valve disc 3 is, however, urged sealingly against the seat 4 by the internal air pressure.

Figure 19:
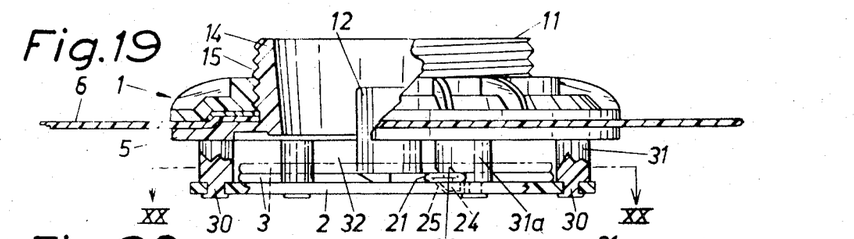
FIG. 19 is a partly broken longitudinal sectional view through a valve arrangement in accordance with a sixth embodiment of the invention.
Figure 20:
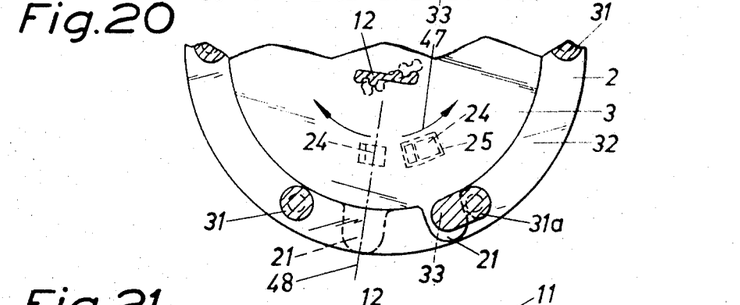
FIG. 20 is a partly broken cross-sectional view through this valve arrangement along line XX—XX of FIG. 19.

In accordance with the embodiment of FIGS. 19 and 20 of the invention no separate spring 40 is required. One of the studs 8, viz, the one designated 31a, is provided with a shoulder 33 facing the bottom plate 2 and positioned away from said date a distance which only slightly exceeds the thickness of the tongue 21 of the valve disc 3. The valve disc is imagined made from some comparatively rigid yet somewhat resilient plastics material.

When the valve disc 3 is turned counter-clockwise in accordance with arrow 47 in FIG. 20, the tongue 21 will engage underneath the shoulder 33. However, it is not possible without further to turn the valve disc into blocking position (illustrated in full lines in FIG. 20). This is so because on its lower face the valve disc is provided with a blocking boss 24 and the bottom plate 2 with a recess 25. These two details are spaced such a mutual distance apart in relation to stud 31a that it becomes impossible to turn the valve disc 3 counter-clockwise into blocking position wherein the tongue 21 lies underneath the shoulder 33 without first forcing the valve disc, against the action of the reciliency of the material of the valve disc 3 and the valve housing bottom 2, to bend in a curve about an imaginary line 47 passing around the tongue 21 and the shoulder, as only then it becomes possible for the boss 24 to slide down into the recess 25 in the bottom plate 2. Consequently, only through snap action is it possible for the valve disc to be forced to take its blocking position in which it is retained during evacuation of the inflated article on which the valve is attached, there being no risk that the valve disc will be sucked away by the air stream flowing outwards through the mouth 14 and place itself sealingly against the valve seat 4. Naturally, it is then not either possible to turn the valve disc 3 clockwise in accordance with FIG. 20 into free position without first bending the disc somewhat upwards adjacent the tongue 21 against the action of the inherent resiliency of the disc material.

Figure 21:
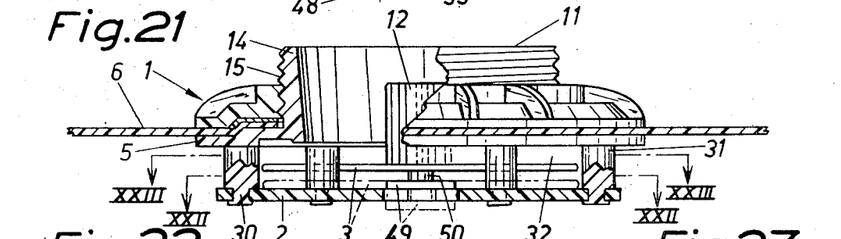
FIG. 21 is a partly broken longitudinal sectional view through a valve arrangement in accordance with a seventh embodiment of the invention.
Figure 22:
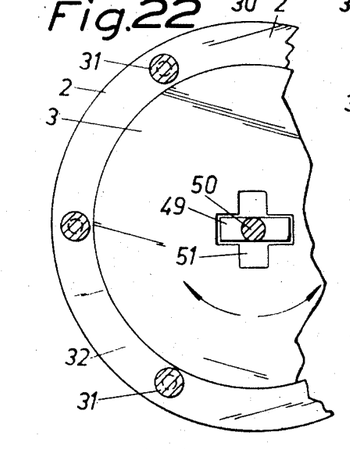
FIG. 22 is a cross-sectional view through the valve arrangement along line XXII—XXII of FIG. 21.
Figure 23:
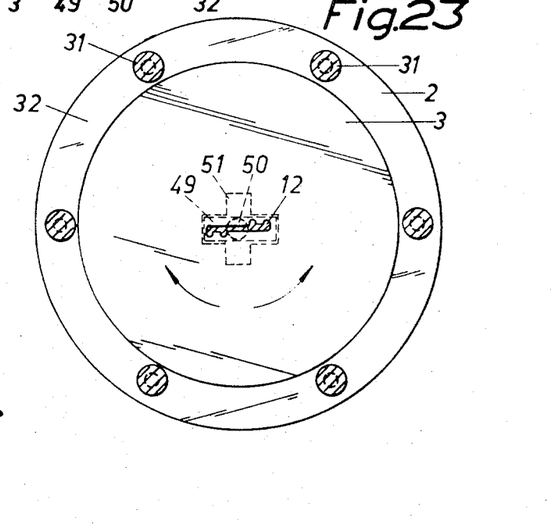
FIG. 23 is a partly broken cross-sectional view along line XXIII—XXIII of FIG. 21.

In the embodiment of FIGS. 21-23 of the valve arrangement the tongue arranged radially at the periphery of the valve disc 3 has been eliminated. Instead, the valve disc is provided with a centrally located, oblong blocking plate 49 which is attached at the lower face of the disc and secured thereto by means of a pin 50 the height of which slightly exceeds the thickness of the bottom plate 2. The latter is provided in a central location with a cross-shaped aperture 51 into which the blocking plate 49 may be inserted from above.

When the inflated article in question is to be evacuated, the valve disc 3 is pushed downwards, the fingers of one hand gripping around the finger gripping element 12, while care is being taken that the blocking plate 49 passes down through the opening 51, whereupon the valve disc is turned over approximately 45° such that the blocking plate 49, possibly while flexing, will be positioned below the bottom plate. In the blocked position thus assumed, the valve disc is prevented from being unintentionally sucked away by the air stream through the mouth 14 in the direction towards the valve seat 4 upon evacuation of the inflated article. When the valve disc is to be returned to free position it is turned in such a way that the blocking plate 49 again may be pulled up through the opening 51 formed in the bottom plate 2. When the valve disc 3 with the blocking plate 49 positioned above the bottom plate 2 has been somewhat turned, it will rest freely on the bottom plate and thus it may be lifted by the air pressure in the inflated article and be pressed into sealing engagement with the valve seat 4.

If desired, the blocking plate 49 and possibly also the lower face of the bottom plate 2, may be formed with blocking means preventing the valve disc 3 from being unintentionally turned to a position in which the valve disc together with the blocking plate leaves the aperture 51 in the bottom plate 2.

Figure 24:
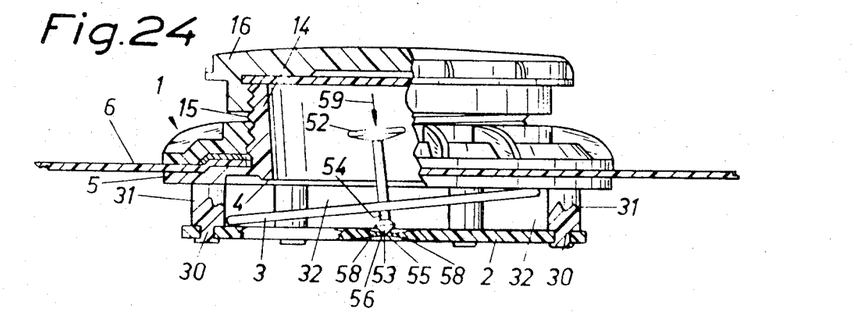
FIG. 24 is a partly broken longitudinal section through a screw top valve arrangement according to an eighth embodiment of the invention, the valve disc being in free position.
Figure 25:
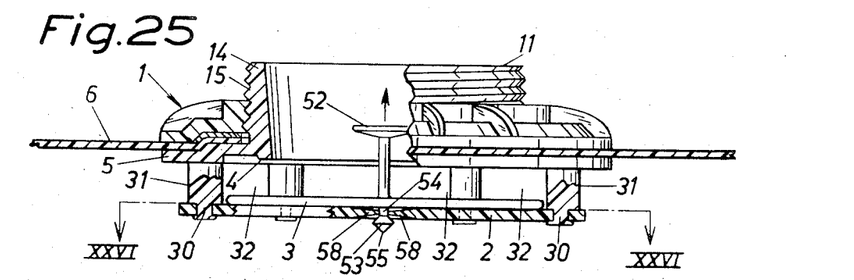
FIG. 25 is a similar longitudinal section with the valve disc in blocked position.
Figure 26:
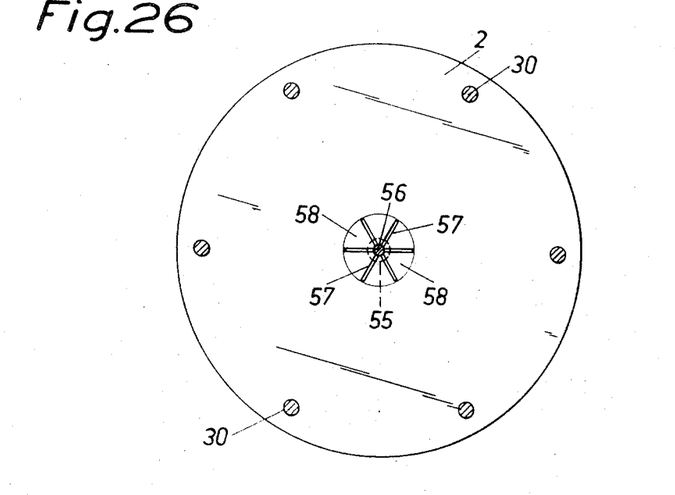
FIG. 26 is a cross-sectional view through the valve arrangement along line XXVI—XXVI of FIG. 25.

The valve disc 3 in accordance with the embodiment shown in FIGS. 24-26 is provided with a knob 52 serving as a gripping means for the fingers and projecting upwards into the valve housing mouth 14. Opposite the knob 52 on the opposite side of the valve disc 3 a head 53 is arranged on the outer (lower) end of a neck portion 54. The head 53 tapers at its free end 55 into a pike.

In its central area, the bottom plate 2 is provided with an opening 56 from which slots 57 extend radially, these slots delimiting between them tongues 58. The bottom plate 2 is made from a relatively rigid yet resilient plastics material. The thickness of the tongues 59 decreases in the direction towards the opening 56 such that they become sufficiently resilient or springy but yet are rigid enough to serve their purpose.

When the article in question is to be inflated, the valve disc 3 is positioned loosely on top of the bottom plate 2 (FIG. 24). It thus does not prevent to any significant degree the pressurized air stream through the mouth 14 from passing through the openings 32 in the valve housing 1 to the the interior of the article in question. Upon completion of the inflating action, the valve disc 3 is forced by the internal air pressure inside the article into sealing abutment against the seal 4.

When the inflated article is to be evacuated, one finger presses the knob 52 in the direction illustrated by arrow 59 in FIG. 24 such that the head 53, while resiliently moving the tongues 58 away, is pressed down into the opening 56. In the lower position (FIG. 25), the tongues 58 spring back to their positions of departure and engage with the neck portion 54. The force retaining valve disc 3 in its blocked position is sufficient to prevent the disc from being sucked by the air stream flowing through the mouth 14 up against the seat 4. Upon completion of the evacuation, the valve disc 3 is again pulled to free position (FIG. 24) by gripping around the knob 52 against the spring action of the tongues 58 which thus return to their flat positions illustrated in the drawings.

In accordance with a modification of the embodiment shown in FIGS. 24-26 the head may be composed of a number of resilient tongues arranged to be inserted together, while in compressed state, into a central aperture made in the valve housing bottom portion. In this case the bottom plate need not be provided with resilient tongue means.

What I claim is:

1. Improvements in air valves for use with comparatively large, inflatable articles, such as, e.g., inflatable furniture, boats of rubber or non-rigid plastics, said valves comprising a valve housing, air through-flow openings formed at the inner end of said valve housing in the valve housing wall, an annular seat facing said valve housing end, a valve disc arranged to be pressed against said seat by the internal pressure in said article so as to abut sealingly against said seat, and means being included to maintain said valve disc at a distance away from said seat during evacuation of air from said article, the improvements comprising said means for releasably blocking said disc in open position at a distance away from said valve seat being formed in said valve disc proper.

2. Improvements in air valves as claimed in claim 1, comprising a lateral tongue formed on said valve disc, a notch formed in said valve housing wall at a distance away from said valve seat, said tongue being arranged, upon displacement of said valve disc laterally, to engage in said notch in order to retain said valve disc releasably in the blocked position of said disc.

3. Improvements in air valves as claimed in claim 1, comprising a finger gripping member accessible from the inlet opening of said valve housing, said finger gripping member being arranged for displacement of said disc into the blocked position of said disc.

4. Improvements in air valves as claimed in claim 2, comprising bosses formed on the face of said valve disc turned away from said valve seat, recesses having sloping bottom surfaces being formed in the bottom plate of said valve housing, said bosses being arranged, upon displacement of said disc into blocked position against the action of the inherent resilience of the material of said disc and possibly also that of said bottom plate, to slide down to be received in said recesses formed in said valve housing bottom plate.

5. Improvements in air valves as claimed in claim 2, comprising a guide channel extending in the longitudinal direction of said valve housing wall, said blocking notch being positioned radially outside said guide channel and arranged to receive in said notch said tongue, said guide channel being so arranged that said valve disc, when moving inside said valve housing, is prevented from turning.

6. Improvements in air valves as claimed in claim 5, comprising a bevelled opening edge formed on said blocking notch to facilitate insertion of said tongue into said notch.

7. Improvements in air valves as claimed in claim 5, comprising inwardly curving portions formed adjacent the root of said tongue on said valve disc to allow free passage for the edges of said guide channel upon displacement of said disc into blocked position.

8. Improvements in air valves as claimed in claim 4, comprising at least one blocking rib formed in the bottom of said valve housing, bosses formed on said valve disc, said bosses moving over said ribs while overcoming the inherent resilience of said valve disc upon displacement of said disc into blocked position.

9. Improvements in air valves as claimed in claim 8, comprising said bosses moving over said ribs while overcoming the inherent resilience of said valve disc and that of said bottom plate upon displacement of said disc into blocked position.

10. Improvements in air valves as claimed in claim 1, comprising a piston forming said blocking means, said piston being arranged upon displacement of said valve disc laterally into blocked position to be lifted against the action of a spring and thereafter to exert a pressing force against the side of said disc facing said seat.

11. Improvements in air valves as claimed in claim 10, comprising a fork-shaped blocking tongue formed on said valve disc, a stud-like wall portion formed integral with said valve housing, said fork legs extending on either side of said wall portion (stud), a blocking shoulder on said wall portion, the mutual base portion of said fork legs engaging underneath said shoulder when said disc is in blocked position.

12. Improvements in air valves as claimed in claim 1, comprising a blocking means, a tongue on said valve disc, said tongue being arranged, upon turning of said disc against the action of a spring means, to be inserted behind said blocking means.

13. Improvements in air valves as claimed in claim 12, comprising a piston forming said blocking means, a spring urging said piston against the side of said tongue facing said valve seat.

14. Improvements in air valves as claimed in claim 13, comprising a blocking abutment formed on said side of said tongue facing the valve disc, said blocking abutment releasably retaining said valve disc in blocked position.

15. Improvements in air valves as claimed in claim 12, wherein a boss means is formed on said valve disc on the side thereof facing away from said valve seat, said boss means preferably having an inclined bottom surface, a stud, a blocking shoulder formed in said valve housing wall on said stud, a correspondingly shaped recess formed in the bottom of said valve housing, said boss means being arranged, upon displacement of said disc into blocked position with said tongue abutting behind said blocking shoulder, to slide down into said valve housing bottom recesses, the improvements comprising said boss means and said recess receiving said boss means being arranged in such a way that turning of said valve disc into blocked position with said tongue engaging behind said shoulder and said boss engaging in said recess is made possible only upon bending said disc against the inherent resilience of said element.

16. Improvements in air valves as claimed in claim 15, comprising said turning being possible only by bending said disc and said bottom plate against the inherent resilience of said elements.

17. Improvements in air valves as claimed in claim 1, comprising a cross-shaped aperture formed in said valve housing bottom, a blocking plate formed on the face of said valve disc turned away from said valve seat, said blocking plate being arranged for insertion into said aperture, possibly against the action of a spring means, and, upon turning of said valve disc, to be blocked in a position wherein said disc is at a distance away from said valve seat.

18. Improvements in air valves as claimed in claim 1, comprising a head formed on said valve disc on the side thereof facing away from said valve seat, a neck portion for supporting said head, a number of resilient tongues formed on said valve housing bottom, the free ends of said tongues being positioned opposite said head, said head being arranged, upon displacement of said valve disc in the direction away from said seat to resiliently bend away said tongues whereby said tongues releasably retain said valve disc in blocked position.

19. Improvements in air valves as claimed in claim 18, comprising a centrally located aperture formed in said valve housing bottom, said tongues being directed radially towards said central aperture.

20. Improvements in air valves as claimed in claim 19, comprising the thickness of said tongues diminishing in the direction towards said central aperture.

21. Improvements in air valves as claimed in claim 20, comprising the tongues being formed integral with said valve housing bottom from a soft, somewhat resilient, synthetic resin material.

22. Improvements in air valves as in claimm 18, wherein the cross-sectional size of said head exceeds that of said neck portion, and wherein said head tapers in the direction towards its free end.

23. Improvements in air valves as claimed in claim 18, wherein a knob serving as a finger gripping member is provided on said valve disc on the side thereof opposite said head.

24. A modification of the improved air valve claimed in claim 18, comprising a number of resilient tongues, a centrally located aperture formed in said valve housing bottom, said resilient tongues being arranged for insertion into said central aperture while pressed towards one another.

* * * * *